United States Patent
Hasegawa

(10) Patent No.: US 6,751,405 B1
(45) Date of Patent: Jun. 15, 2004

(54) VIDEO RECORDING APPARATUS AND RECORDING METHOD THEREFOR

(75) Inventor: Satoshi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/547,313

(22) Filed: Apr. 11, 2000

(30) Foreign Application Priority Data

Apr. 13, 1999 (JP) .......................................... 11/105793

(51) Int. Cl.[7] .............................. H04N 7/26; H04N 7/12; H04N 11/02; H04N 11/04
(52) U.S. Cl. ............................ 386/111; 375/240.16
(58) Field of Search .............................. 386/1, 33, 110, 386/111, 112, 131; 348/446, 448, 458, 459; 375/340.12–340.16, 340.21

(56) References Cited

U.S. PATENT DOCUMENTS

| | | | | |
|---|---|---|---|---|
| 5,453,801 A | * | 9/1995 | Kim ........................... 348/699 |
| 5,592,225 A | * | 1/1997 | Kurobe ................... 375/240.03 |
| 5,619,281 A | * | 4/1997 | Jung ........................... 348/699 |
| 5,818,967 A | * | 10/1998 | Bhattacharjee et al. ..... 382/233 |
| 6,031,584 A | * | 2/2000 | Gray ..................... 375/240.28 |
| 6,061,399 A | * | 5/2000 | Lyons et al. ................. 375/240 |
| 6,330,286 B1 | * | 12/2001 | Lyons et al. ........... 375/240.28 |
| 6,356,309 B1 | * | 3/2002 | Masaki et al. ........... 348/439.1 |

FOREIGN PATENT DOCUMENTS

| | | |
|---|---|---|
| JP | 08-111847 | 4/1996 |
| JP | 8-111847 A | 4/1996 |
| JP | 10-155134 | 6/1998 |

* cited by examiner

Primary Examiner—Thai Tran
Assistant Examiner—Polin Chieu
(74) Attorney, Agent, or Firm—Foley & Lardner LLP

(57) ABSTRACT

A video recording apparatus and a method therefor can produce a compressed video data to be reproduced in the same period (frame number) as a period (frame number) upon actual capturing irrespective of picture image or motion to be compressed, without depending upon performance of personal computer upon performing video compression process on a software. The video recording method has a first step of measuring a compression process period per one group of frame data of a video signal taken by video capturing and second step of performing frame dropping process in next one group of frame data when the compression process period exceeds a predetermined value.

17 Claims, 9 Drawing Sheets

VIDEO RECORDING APPARATUS AND RECORDING METHOD THEREFOR

BACKGROUND OF THE INVENTION

1. Field of the Invention

The present invention relates generally to a video recording apparatus and a recording method therefor. More particularly, the invention relates to a video recording apparatus and a recording method therefor, in which compression of video data is performed by a software process.

2. Description of the Related Art

In general, when a personal computer having a video data compression processing function performs video data compression by a software process on CPU without employing a dedicated hardware, such as expansion board or the like, a performance of compression process for performing compression process of a video data taken by a video capture device in real time without delay significantly depends on a performance of the personal computer, particularly CPU. Therefore, when the performance of CPU is not satisfactorily high, it is possible that compression process without delay cannot be realized. In such case, drop out of frame (frame drop out) is caused in the compressed video data can be caused. As a result, number of frames in the compressed video data can be smaller than that of the captured video data. If such compressed video data is reproduced, the reproduction period becomes shorter than the actually captured video period.

One example of a method to certainly provide necessary number of frames in the compressed video data even upon occurrence of the frame drop out has been proposed in Japanese Unexamined Patent Publication No. Heisei 8(1996)-111847, for "Video Recording and Reproducing Method".

In the above-identified publication, upon performing compression of the video data, a motion vector amount which is increased and decreased depending upon motion of video image per frame or per video information block is constantly monitored to make judgment for the condition of the video image on the basis of the motion vector amount immediately before recording the compressed data on a disk drive so that a frame, in which motion is small and difference with preceding and following frames is small is not recorded on the disk drive. Upon reproduction, the frame not recorded is supplemented with the frame preceding or following frame for reducing non-smooth feeling so as to permit long period recording with a limited capacity of the disk drive.

On the other hand, Japanese Unexamined Patent Publication No. 10-155134 discloses a video signal recording method, reproducing method and a video signal recording and reproducing apparatus. In the above-identified publication, the motion vector amount per each frame is monitored to make judgment of the status thereof to perform dropping of frame.

The conventional video recording systems are also directed how to efficiently record the video signal for a long period on the recording apparatus of limited capacity, such as disk drive or the like to perform dropping of frames. Therefore, in such conventional video recording system, frame drop out caused due to delay pf processing timing upon performing video data compression process on the software.

SUMMARY OF THE INVENTION

An object of the present invention is to provide a video recording apparatus and a method therefor which can produce a compressed video data to be reproduced in the same period (frame number) as a period (frame number) upon actual capturing irrespective of picture image or motion to be compressed, without depending upon performance of personal computer upon performing video compression process on a software.

According to the first aspect of the present invention, a video recording method comprises:
first step of measuring a compression process period per one group of frame data of a video signal taken by video capturing; and
second step of performing frame dropping process in next one group of frame data when said compression process period exceeds a predetermined value.

According to the second aspect of the present invention, a video recording method comprising:
first step of measuring a motion vector amount per one group of frame data of a video signal taken by video capturing; and
second step of performing frame dropping process in next one group of frame data when said motion vector amount exceeds a predetermined value.

According to the third aspect of the present invention, a video recording method comprises:
first step of measuring a compression process period and a motion vector amount per one group of frame data of a video signal taken by video capturing; and
second step of performing frame dropping process in next one group of frame data when at least one of said compression process period and said motion vector amount exceeds a predetermined value.

According to the fourth aspect of the present invention, a video recording apparatus comprises:
a video capturing portion taking a video data and outputting a first video signal;
a compression control portion receiving said first video signal, compressing said first video signal for outputting a compressed video signal;
a file output portion for writing and recording said compressed video signal;
  said compression control portion including a timer measuring a compression process period and outputting a time information;
  a motion detecting portion detecting a motion vector amount of said first video signal and outputting detected information;
  a motion vector deriving portion deriving a motion vector amount per a group of frame data from said detected information and outputting a motion vector amount information;
  a video compressing portion performing compression process for a second video signal output from said motion detecting portion and outputting said compressed video signal; and
  a frame drop control portion making judgment whether dropping of frame is to be performed or not for a next one group of frame data from said time information and said motion vector amount information, and outputting a frame drop execution information to said motion detecting portion and said video compressing portion when judgment is made to perform dropping of frame.

In the preferred construction, the video capturing portion may comprise:
a capture control portion capturing control of said picture for outputting as video data; and a capture data memory temporarily storing said video data and outputting said first video signal.

The file output portion may comprise:
a compression data memory storing said compressed video signal and outputting a compressed video data;
a file output control portion file controlling said compressed video data; and
a hard disk controlled by said file output control portion for storing said compressed video data.

If said time information does not exceed a predetermined period, judgment may be made that compression process for one group of frame data us completed, and said time information exceeds said predetermined period, frame drop process for next one group of frame data may be set.

A difference between a compression process period of said one group of frame data and a compression process period of the next one group of frame data, may be calculated and dropping of frame is determined by comparing the difference with a preset value.

If said motion vector amount information does not exceed a preset value, judgment may be made that compression process for said one group of frame data is completed, and when said motion vector amount information exceeds the preset value, dropping of frame for the next group of frame data is set.

A difference between a motion vector amount information of said one group of frame data and a motion vector amount information of the next one group of frame data, may be derived, and the difference is compared with a preset value for determining dropping of frame. In the alternative, a difference between a compression process period of said one group of frame data and a compression process period of the next one group of frame data, may be calculated and the difference is compared with a preset valued, when frame cannot be dropped in the next group of video data, dropping of the frame may not be performed in the next group of video data for repeat setting for frame dropping in two next group of frame data, and thereafter a post process is performed. A difference between a compression process period of said one group of frame data and a compression process period of the next one group of frame data, may be calculated and the difference is compared with a preset valued, when frame cannot be dropped in the next group of the frame data, dropping of the frames is brought forward to further next group of the frame data in the condition where the number of frames to be dropped is increased.

The second step may include determining of dropping of frame by deriving a difference between the compression processing period of said one group of the frame data and the compression processing period of the next group of the frame data and comparing the difference with the predetermined value when said compression process period exceeds said predetermined period.

The second step may include determining of dropping of frame by deriving a difference between the motion vector amount of said one group of the frame data and the motion vector amount of the next group of the frame data and comparing the difference with the predetermined value when said compression process period exceeds said predetermined period. In the alternative, the second step may include determining of dropping of frame by deriving a difference between the motion vector amount of said one group of the frame data and the motion vector amount of the next group of the frame data and comparing the difference with the predetermined value when said motion vector amount exceeds said predetermined period. The second step may also include determining of dropping of frame by deriving a difference between the compression processing period of said one group of the frame data and the compression processing period of the next group of the frame data and, if the next group of the frame data does not permit dropping of the frame, dropping of the frame being brought forward to the two next group of the frame data instead of performing dropping of frame in the next group of the frame data. The second step includes determining of dropping of frame by deriving a difference between the compression processing period of said one group of the frame data and the compression processing period of the next group of the frame data and, if the next group of the frame data does not permit dropping of the frame, dropping of the frame is brought forward to the further next group of the frame data in the condition where the number of frames to be dropped is increased.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
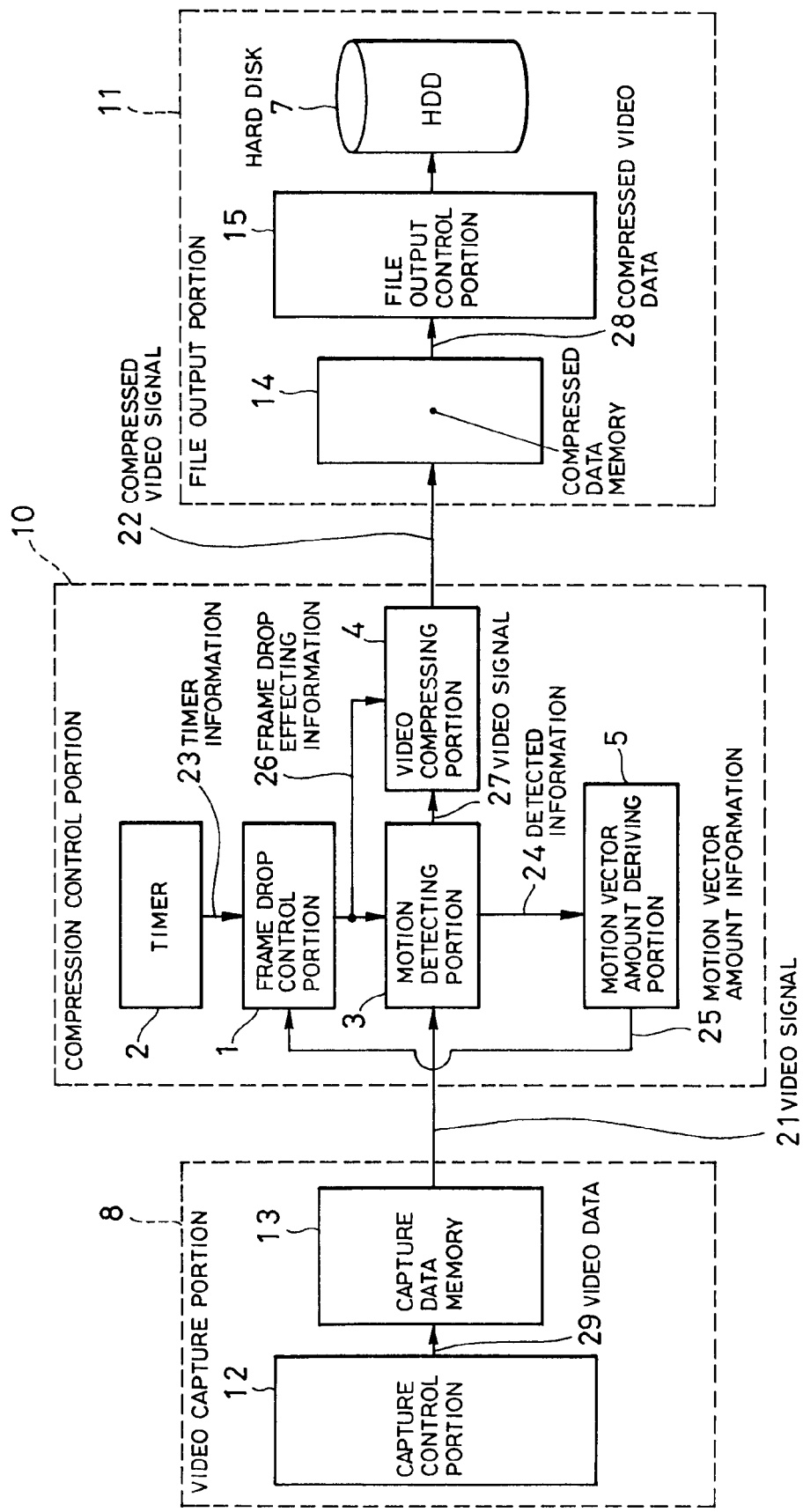
FIG. 1 is a block diagram showing the first embodiment of a video recording apparatus according to the present invention.

FIG. 1 is a block diagram showing the first embodiment of a video recording apparatus according to the present invention.

The first embodiment shown in FIG. 1 is constructed with a video capturing portion 8 for capturing a video data, a compression control portion 10 receiving a video signal captured by the video capturing portion 8 and outputting a compressed video signal 22 by providing compression process for the input video signal, and a file output portion 11 for writing and recording the compressed video signal 22.

The video capturing portion 8 has a capture control portion performing video capturing control to output as a video data 29 and a capture data memory 13 temporarily storing the captured video data 29.

The compression control portion 10 includes a timer 2 measuring a compression processing period for outputting a time information 23, a motion detecting portion 3 detecting a motion vector amount of the video signal for outputting a detected information 24, a motion vector amount deriving portion 5 deriving a motion vector amount per 1 group of picture (hereinafter referred to as GOP) from the detected information 24 for outputting a motion vector amount information 25, a video compressing portion 4 performing compression process of the video signal output from the motion detecting portion for outputting a compressed video signal 22, and a frame drop control portion 1 making judgment whether frame drop is to be effected for next GOP and outputting a frame drop effecting information 26 to the motion detecting portion 3 and the video compressing portion 4 when judgment to effect frame drop is made. Here, it should be noted that "group of picture (GOP)" means a group of picture data., in which video data of several pictures are aggregated.

On the other hand, the file output portion 11 has a hard disk 7, a compressed data memory 14 storing the compressed video signal 22 and a file output control portion 15 recording the compressed video data 28 read out from the memory on the hard disk 7.

Next, operation will be discussed with reference to FIG. 1. The frame drop control portion 1 makes judgment of a current video compression processing state and a video condition on the basis of a time information 23 from a timer 2 counting the compression process period per 1 GOP and the motion vector amount information 25 from the motion vector amount deriving portion 5 deriving the motion vector amount. As a result, if the process period is in excess and also the picture is in a condition where motion is a little, the excess of elapsed period can be recovered by performing the frame dropping process in GOP process and not performing the compression process for the frame. On the other hand, the dropped frame can be compensated by repeatedly displaying the frame immediately preceding or following frame so that the user of the apparatus may not perceive drop of the frame.

Upon performing image compressing process on the software, the compressed video data 28 which does not depend on performance of the personal computer and can reproduce in the same period (number of frame) as the period (number of frames) actually performing capture irrespective of picture pattern or motion to be compressed.

When the video signal 21 captured by the video capture portion 8 is input to the motion detecting portion 3, after deriving the motion vector amount by the motion detecting portion 3, the video signal is output. Actual compression process is performed in the video compressing portion 4 to be processed as the compressed video signal 22. When the compressed video signal 22 is output to the compressed data memory 14 and the file output control portion 15, the compressed video signal is stored in the recording device, such as the hard disk 7 or the like. On the other hand, the frame drop control portion 1 obtains the time information 23 from the timer 2 counting the compression processing period and the motion vector amount information 25 from the vector amount deriving portion 5 deriving the motion vector amount per 1 GOP to make judgment whether frame drop is to be effected in the next GOP. When judgment is made that frame drop is to be effected, the fact is notified to the motion detecting portion 3 and the video compressing portion 4 the frame drop performing information 26, for performing the process.

The video data 29 captured by the capture control portion 12 is temporarily stored in the capture data memory 13 and subsequently performs compression process of the video data by the compression control portion 10. The compressed video signal processed by the compression process is temporarily stored in the compressed data memory 14, and then is stored by the file output control portion 15 by the storage device, such as hard disk 7 or so forth.

Figure 2:
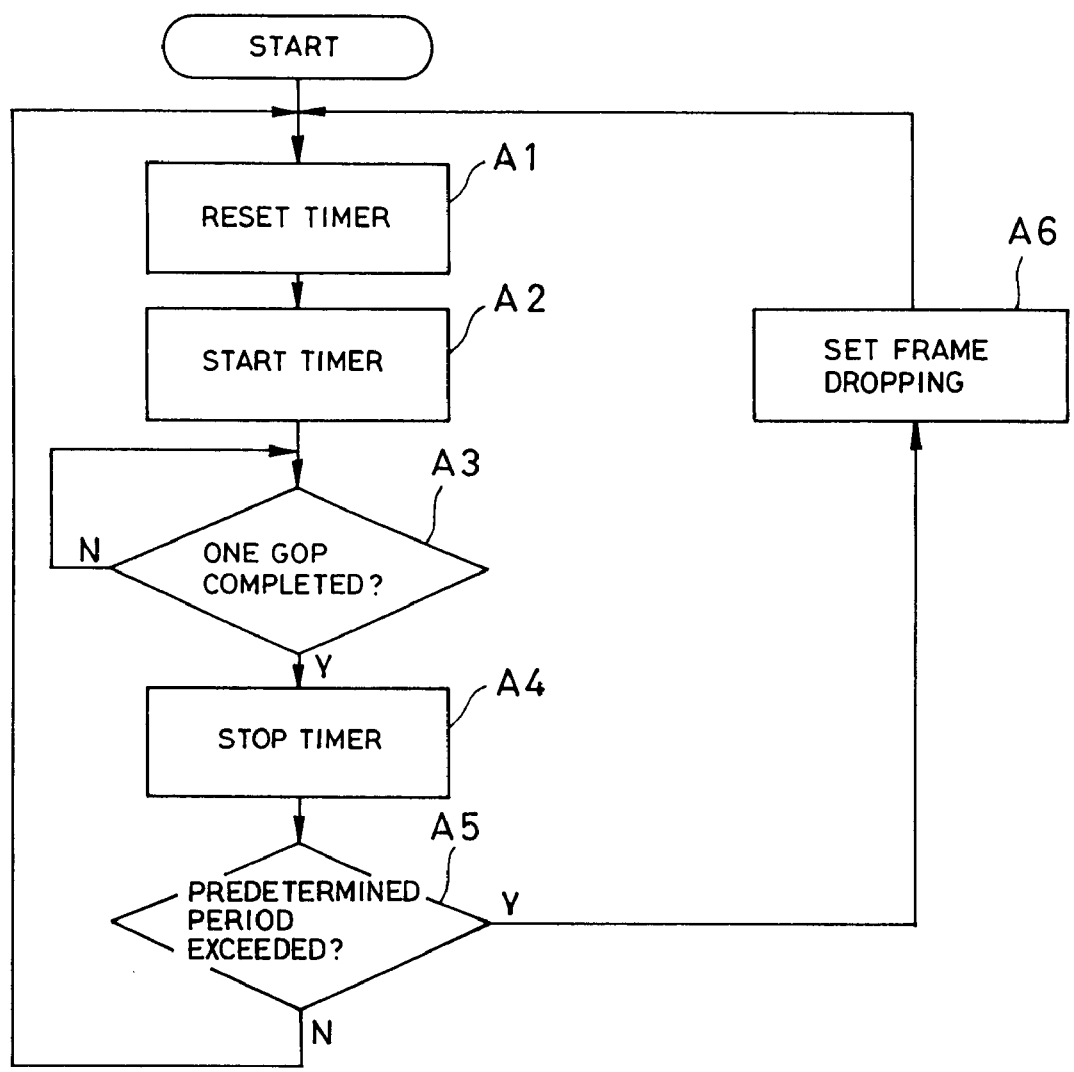
FIG. 2 is a flowchart showing operation of the first embodiment of a video recording method according to the present invention.
Figure 3:
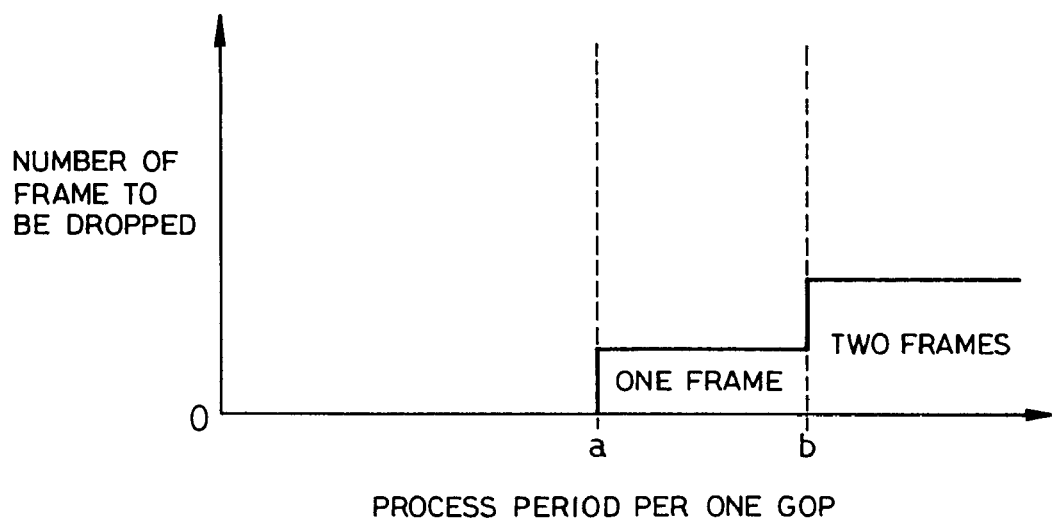
FIG. 3 is an explanatory illustration for determining number of dropping of frame.

FIG. 2 is a flowchart showing operation of the first embodiment of the video recording method according to the present invention, and FIG. 3 is an explanatory illustration for determining number of dropping of frame.

Operation of the shown embodiment will be discussed hereinafter in detail with reference to FIGS. 1, 2 and 3.

At first, the shown process is performed per video information block called as group of picture (GOP). In general, 1 GOP is consisted of fifteen frames, and for a period of 0.5 seconds. When compression process of the video signal 21 captured by the video capturing portion 8 is initiated, the time information 23 of the timer 2 is reset to start timer count (steps A1 and A2). Then, the video compression process is actually initiated, the video compression is repeated until data for one GOP is compressed (step A3). When data for one GOP is compressed, the timer 2 is stopped and the period taken for compressing data for one GOP is obtained (step A4).

The time information 23 is compared with a process period per one GOP shown in FIG. 3 (step A5). If judgment is made that the time information 23 is shorter than a preliminarily period a, it is judged that the compression process for one GOP is completed in real time to reset the timer 2 and initiate timer count for performing compression process for the next GOP.

On the other hand, when the time information 23 is in excess of the predetermined period a, it is judged that compression process cannot be completed for one GOP in real time. Then, setting for frame drop process in the next process GOP process is performed (step A6). Thereafter, the process transit to the next GOP process. Namely, a period taken for compression process is measured per one GOP, and if the measured period is in excess of the predetermined value, from drop process is performed for the process of the next GOP. Accordingly, the frame drop process is not performed in the currently processed GOP. Number of frames to be dropped in the next GOP is determined by applying the period taken for processing the current GOP to FIG. 3. Basically, at every occurrence of excess of the compression process period for one frame, the number of frames to be doped in the next GOP is increased on by one.

Discussing FIG. 3 in detail, in case of normal MPEG, one GPO becomes a data of 0.5 seconds (15 frames). In order to perform compression process in real time, it becomes necessary to complete compression process for one GOP within 0.5 seconds. Here, it is assumed that a time "a" represented on the horizontal axis "process period per one GOP" is 0.5 seconds. When the process period per one GOP is in excess of time "a", it represents that compression process is not performed in real time. In the compression process for next one GOP, dropping of one frame is performed. Namely, a period exceeded in the compression process can be recovered in the next one GOP. When compression process is performed for data of 1 GOP=15 frames=0.5 seconds, the process period per one frame will be 0.5 (seconds)/15 (frames)=0.33 (seconds). Here, when excess period of the compression process for one GOP is less than 0.33 seconds, accordingly, when the compression period is less than 0.533 (0.5+0.033), the excess period can be recovered by dropping one frame in the compression process of next GOP. However, when the excess period becomes greater than or equal to 0.33 seconds, the excess period cannot be recovered by dropping one frame in the compression process of the next GOP. Therefore, dropping of two or more frames becomes necessary. Since a time "b" of FIG. 3 shows 0.033 seconds as excess period, 0.533 seconds is shown as the horizontal axis "process period per one GOP". Accordingly, when the process period exceeds "b", dropping of two frames is performed in the compression process of next GOP.

For convenience of disclosure, a period on the horizontal axis is limited to two kinds of "a" and "b" in FIG. 3. Whenever the compression processing period exceeds per 0.033 seconds, number of frames to be dropped in compression process for next GOP is increased per one frame.

When video compression by MPEG system is to be performed, if I frame or P frame called as key frame is dropped, B frame which is to be generated with taking the I frame or the P frame as reference image, cannot be reproduced. Therefore, frame dropping process for B frame is performed. Here, as frame time of the display, three types of I frame, P frame and B frame are defined. I frame represents an Intra coding image (intra-frame coding image), P frame represents a Predictive coding image (inter-frame forward prediction coding image) and B frame represents Bidirectionally predictive coding image.

By performing frame drop, it becomes unnecessary to perform compression process for dropped frame. Therefore, the period otherwise required for compression for dropped frame, can be spent for the exceeded period in the compression process of the preceding GOP. Thus, at this timing, the exceeded period can be compensated.

Dropping of frame naturally cause drop out of the frame. Therefore, even though compression can be done in real time, when the compressed data is reproduced, the reproduction period becomes inherently shorter than the actually captured period. Therefore, recovery for the dropped frames becomes necessary, There are following two kinds of solutions. The first measure is to recover the dropped frame by inserting the frame identical to the preceding frame at the position where the dropped frame is originally present. The second measure is to set a flag in a picture header at the position where the frame is dropped for repeatedly displaying preceding or following frame on the side of a reproducing apparatus upon reproduction (decoding). Either measures set forth above may be taken. In case of the system, in which frame drop out can be judged on the side of the reproducing apparatus adapting to the reproduction rate of the frame, it is only required to put the picture header at the position where the frame is dropped, without consideration of recovery of frame.

It should be appreciated that when a quite large number of frames are dropped in the compression process for the next GOP, if reproduction process of the compressed data is performed, motion of the reproduced picture becomes awkward except for the case where the picture is completely still condition to provide quite non-smooth feeling to the user. Therefore, it becomes necessary to preliminarily determine the maximum number of frames to be dropped in the compression process of the next GOP when a period greater than or equal to a given period is taken for the compression process.

By managing the period required for compression, real time compression of the captured image becomes possible. Also, even when the image data is reproduced, the reproduced period may not be shorter than the period of the image actually captured.

Figure 4:
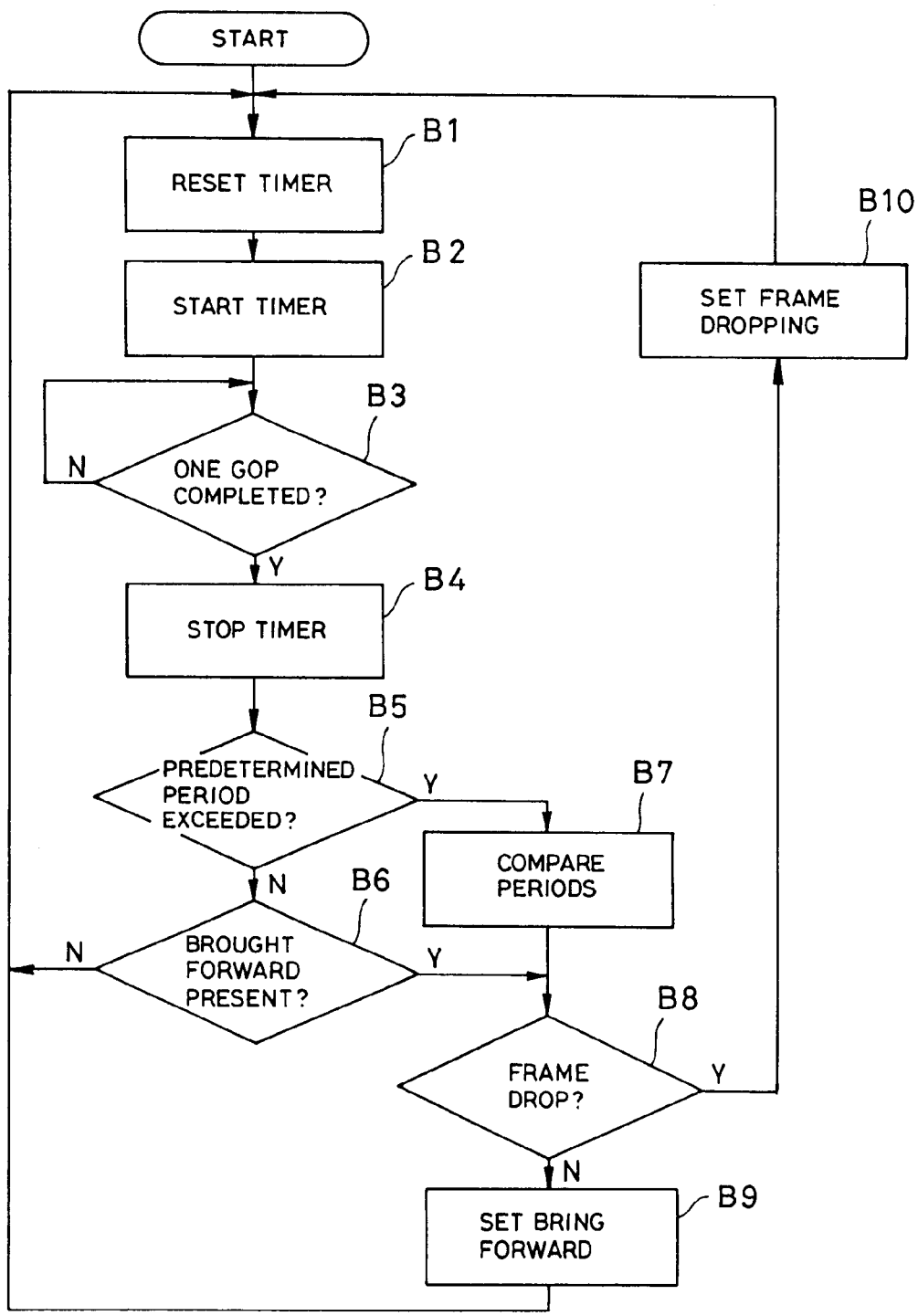
FIG. 4 is a flowchart showing operation of the second embodiment of a video recording method according to the present invention.

FIG. 4 is a flowchart showing the second embodiment of the video recording method according to the present invention.

Figure 5:
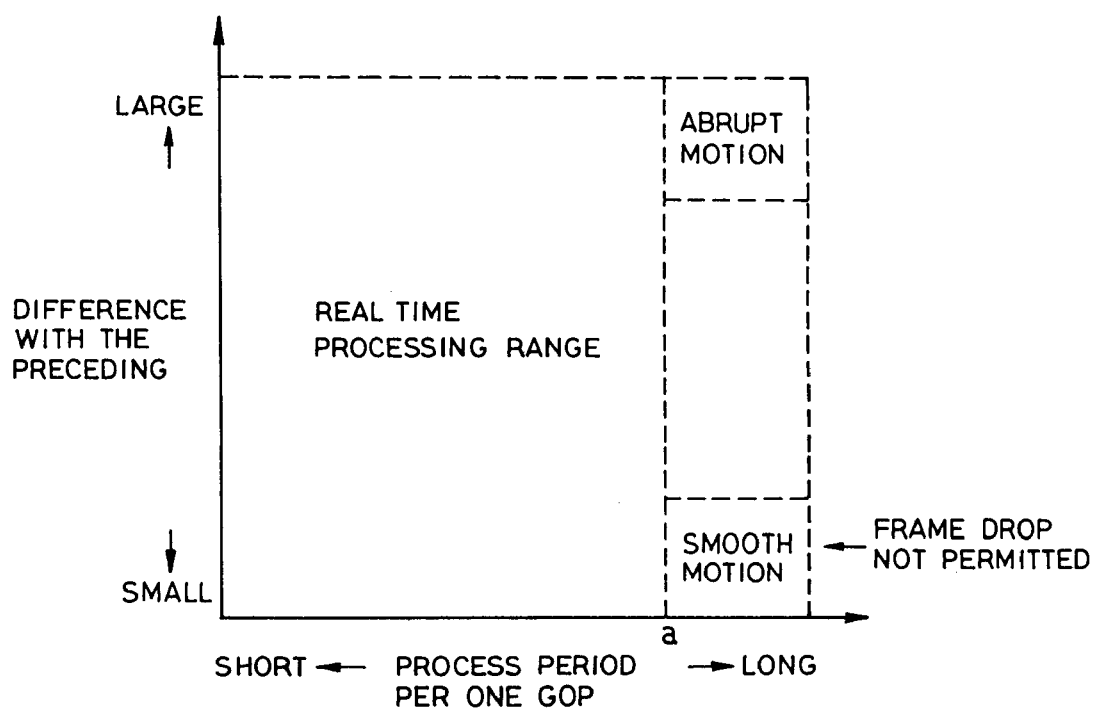
FIG. 5 is an explanatory illustration for making judgment of frame dropping process.

FIG. 5 is an illustration for explaining judgment of the frame drop process.

Operation of the second embodiment of the video recording method will be discussed in detail with reference to FIGS. 1, 3, 4 and 5.

At first, the shown process is also performed per video information block called as GOP. When compression process of the video signal 21 captured by the video capturing portion 8 is initiated, the time information 23 of the timer 2 is reset to start timer count (steps B1 and B2). Then, the video compression is repeated until data for one GOP is compressed (step B3). When data for one GOP is compressed, the timer 2 is stopped and the period taken for compressing data for one GOP is obtained (step B4). The time information 23 is compared with a process period per one GOP shown in FIG. 3 (step B5). If judgment is made that the time information 23 is shorter than a preliminarily period a, it is judged that the compression process for one GOP is completed in real time to reset the timer 2. On the other hand, when the time information 23 is in excess of the predetermined period a, it is judged that compression process cannot be completed for one GOP in real time. Then, setting for frame drop process in the next process of GOP process is performed. Basically, at this time, determination is made that frame drop is to be performed. However, when judgment is made that the current process period is quite large, the process in the next GOP is differentiated. At first, a period taken for the process of the preceding GOP and a period taken for the process of the current GOP are compared to derive a difference value. Then, the difference value is applied to a graph shown in FIG. 5 for making judgment. By taking the difference, the status of the current image can be detected. When the process period for one GOP is large, for example, the difference is quite large, it can be judged that quite large motion is abruptly caused (awkward motion). Conversely, when the difference is quite small, judgment can be made that large motion is continued (smooth motion). Here, judgment of frame drop in the next GOP is made. If dropping of frame is performed while judgment is made that smooth motion is performed, frame drop can be easily perceived as reproduced. In such case, frame drop is not performed and repeat setting for effecting frame drop in the two next GOP. Thereafter, the process for the next GOP is performed (steps B7, B8 and B9). On the other hand, if judgment is made that the motion of the picture is not particularly smooth, frame dropping is determined for effecting frame dropping in the process of the next GOP. Then process transit to the process for the next GOP (steps B7, B8 and B10).

It should be noted that even when the process period during the process of the next GOP does not exceed the predetermined period a, if the repeat setting is made, the frame drop process is performed in the process of the next GOP unconditionally (step B6). When the process period of the process of the current GOP is large, condition of frame drop in the next GOP is determined.

It should be noted that in some condition, there is a case where the frame drop process cannot be performed in the two next GOP process. In such case, the process of frame drop is brought forward to the further next GOP. In addition, it is considered that the number of the frame to be dropped is increased. In such case, the process for dropping of frame is brought forward to the further next GOP in the condition where the number of frames to be dropped is increased. However, when the quite large number of frames are dropped in the process of one GOP, if reproduction process of the compressed data is performed, motion of the reproduced picture becomes awkward except for the case where the picture is completely still condition to provide quite non-smooth feeling to the user. Therefore, it becomes necessary to preliminarily determine the maximum number of frames to be dropped in the compression process of the next GOP when a period greater than or equal to a given period is taken for the compression process. Even when the image data is reproduced, the reproduced period may be shorter than the period of the image actually captured. Therefore, recovery for the dropped frame becomes necessary. There are following two kinds of solutions. The first measure is to recover the dropped frame by inserting the frame identical to the preceding frame at the position where the dropped frame is originally present. The second measure is to set a flag in a picture header at the position where the frame is dropped for repeatedly displaying preceding or following frame on the side of a reproducing apparatus upon reproduction (decoding). Either measures set forth above may be taken. In case of the system, in which frame drop out can be judged on the side of the reproducing apparatus adapting to the reproduction rate of the frame, it is only required to put the picture header at the position where the frame is dropped, without consideration of recovery of frame.

By managing the period required for compression, real time compression of the captured image becomes possible. Also, even when the image data is reproduced, the reproduced period may not be shorter than the period of the image actually captured. On the other hand, since frame drop is performed by predicting condition of the picture in the next GOP by comparing the compression process period of the preceding GOP and the process period of the currently processed GOP, portion where the frame is dropped becomes hardly perceived upon reproduction.

Figure 6:
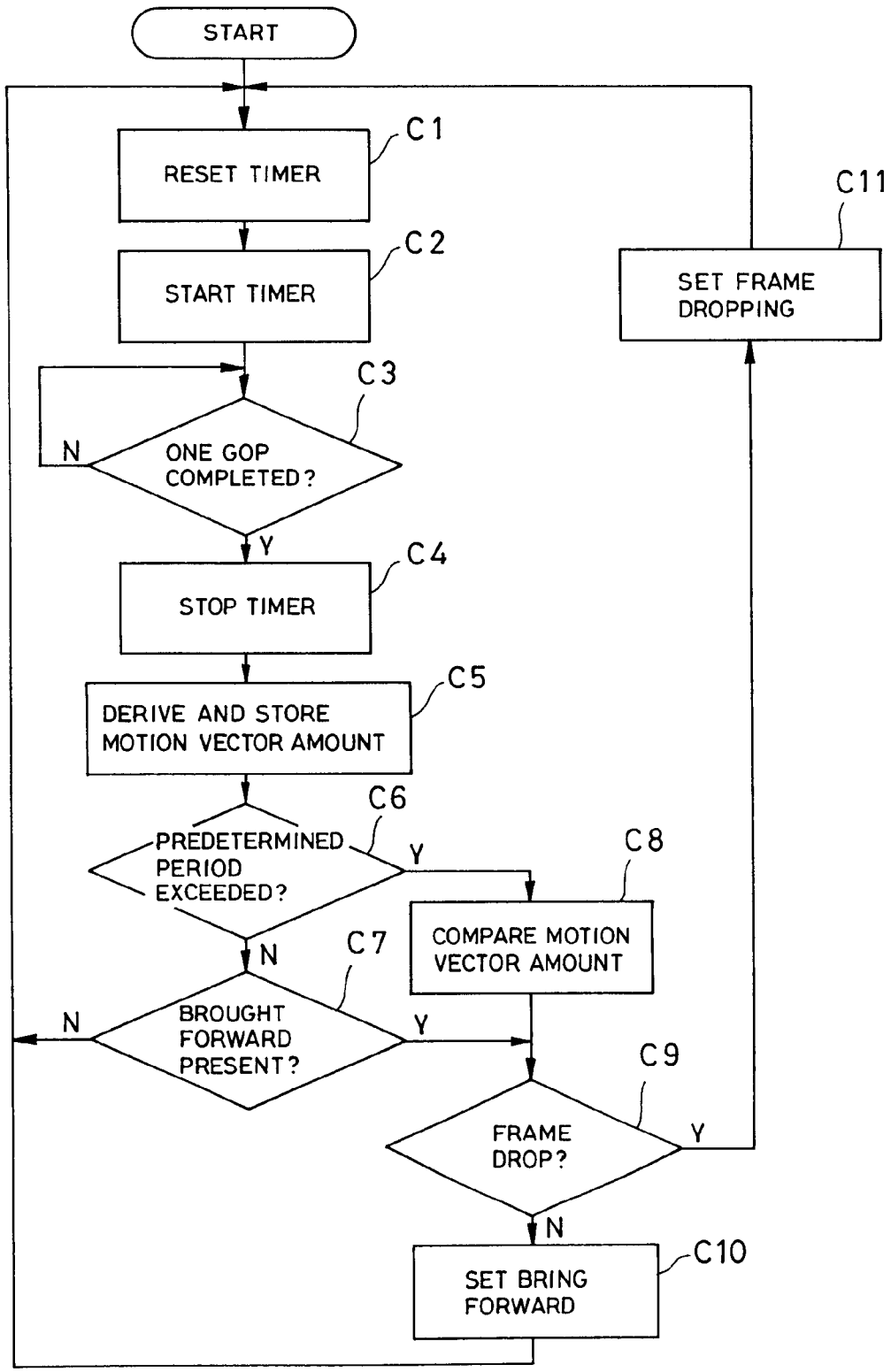
FIG. 6 is a flowchart showing operation of the third embodiment of a video recording method according to the present invention.

FIG. 6 is a flowchart showing the third embodiment of the video recording method according to the present invention.

Figure 7:
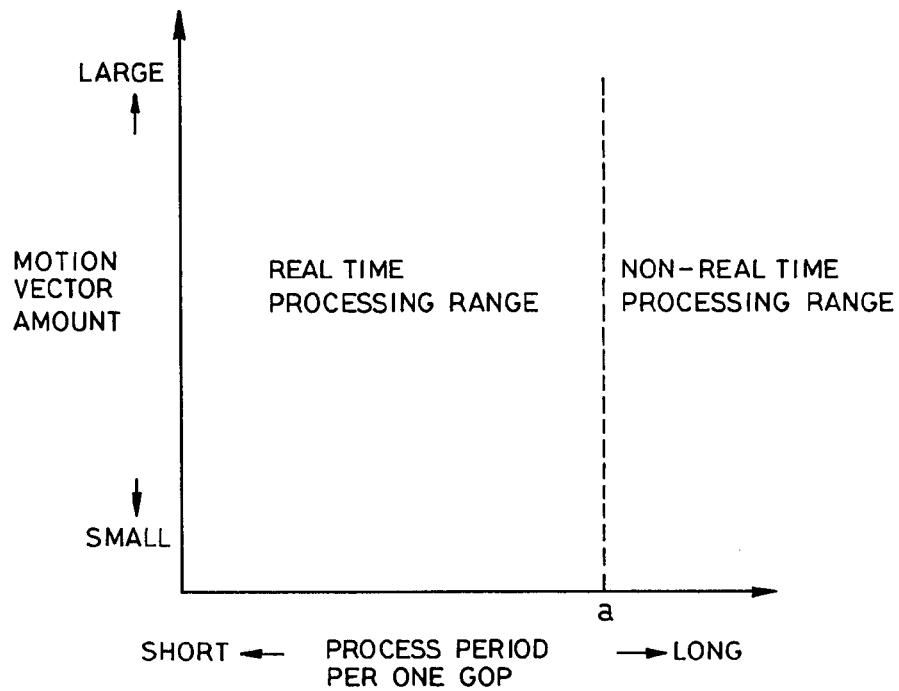
FIG. 7 is an explanatory illustration for explaining process period per 1GOP

FIG. 7 is an illustration for explaining process period per one GOP.

Figure 8:
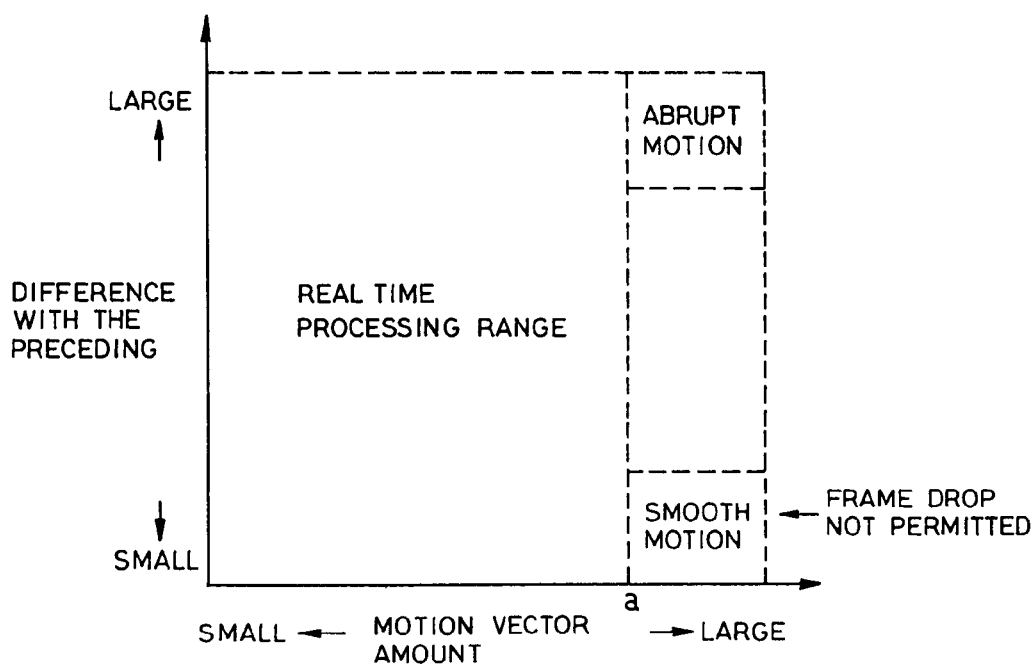
FIG. 8 is an explanatory illustration for making judgment of frame dropping process.

FIG. 8 is an illustration for explaining judgment of the frame drop process.

Operation of the third embodiment of the video recording method will be discussed in detail with reference to FIGS. 1, 3, 6, 7 and 8.

At first, the shown process is also performed per video information block called as GOP. When compression process of the video signal 21 captured by the video capturing portion 8 is initiated, the time information 23 of the timer 2 is reset to start timer count (steps C1 and C2). Then, the video compression is repeated until data for one GOP is compressed (step C3). When data for one GOP is compressed, the timer 2 is stopped and the period taken for compressing data for one GOP is obtained (step C4). Next, a motion vector amount detected by GOP is derived, and the motion vector amount is stored for use in data compression for the next GOP (step C5). The period taken for compression of the data for GOP obtained preceding is compared with the process period per one GOP shown in FIG. 3 (step C6). If judgment is made that the time information 23 is shorter than a preliminarily period a, it is judged that the compression process for one GOP is completed in real time to reset the timer 2. On the other hand, when the time information 23 is in excess of the predetermined period a, it is judged that compression process cannot be completed for one GOP in real time.

Then, frame drop process is performed in the process of the next GOP process. Basically, at this time, determination is made that frame drop is to be performed. However, when judgment is made that the current motion vector amount is quite large, the process in the next GOP is differentiated. At first, a motion vector amount taken for the process of the preceding GOP and a motion vector amount taken for the process of the current GOP are compared to derive a difference value (step C8). Then, the difference value is applied to a graph shown in FIG. 8 for making judgment. By comparing with the difference value of the preceding time, the state of the current picture can be detected. When the process period for the motion vector amount in one GOP is large, for example, the difference is quite large, it can be judged that quite large motion is abruptly caused (awkward motion). Conversely, when the difference is quite small, judgment can be made that large motion is continued (smooth motion). Here, judgment of frame drop in the next GOP is made (step C9). If dropping of frame is performed while judgment is made that smooth motion is performed, frame drop can be easily perceived as reproduced. In such case, frame drop is not performed and repeat setting for effecting frame drop in the two next GOP. Thereafter, the process for the next GOP is performed (steps C8, C9 and C10). When the motion vector in the current GOP process is large, condition of frame dropping for the next GOP is determined.

It should be noted that in the shown embodiment, comparison is performed in the compression process period per one GOP. The reason is that when judgment for frame dropping amount is made based on only motion vector amount per one GOP as shown in FIG. 7, it is possible that the process period falls within the range of real time even when the motion vector amount is large. In view of the time, the frame dropping process well-affected to the motion of the picture can be performed.

Recovery process for the portion where the frame is dropped is the same as those discussed with respect to the first and second embodiments.

In either embodiment, the function of the frame drop control portion 1 making judgment whether frame dropping is to be performed in the next GOP control portion 1 making judgment whether frame dropping is to be performed in the next GOP has an important part of the process. The judgment is performed using the time information 23 of the timer 2 and the motion vector amount information 25 for one GOP derived by the motion vector amount deriving portion 5. Here, when the a criterion for judgment is those shown in FIG. 5 and 8, and when the judgment is made based on only time information 23, the criterion is that shown in FIG. 5.

When judgment is made based on both of the time information 23 and the motion vector amount information 25, the criterion is that shown in FIG. 8.

Figure 9:
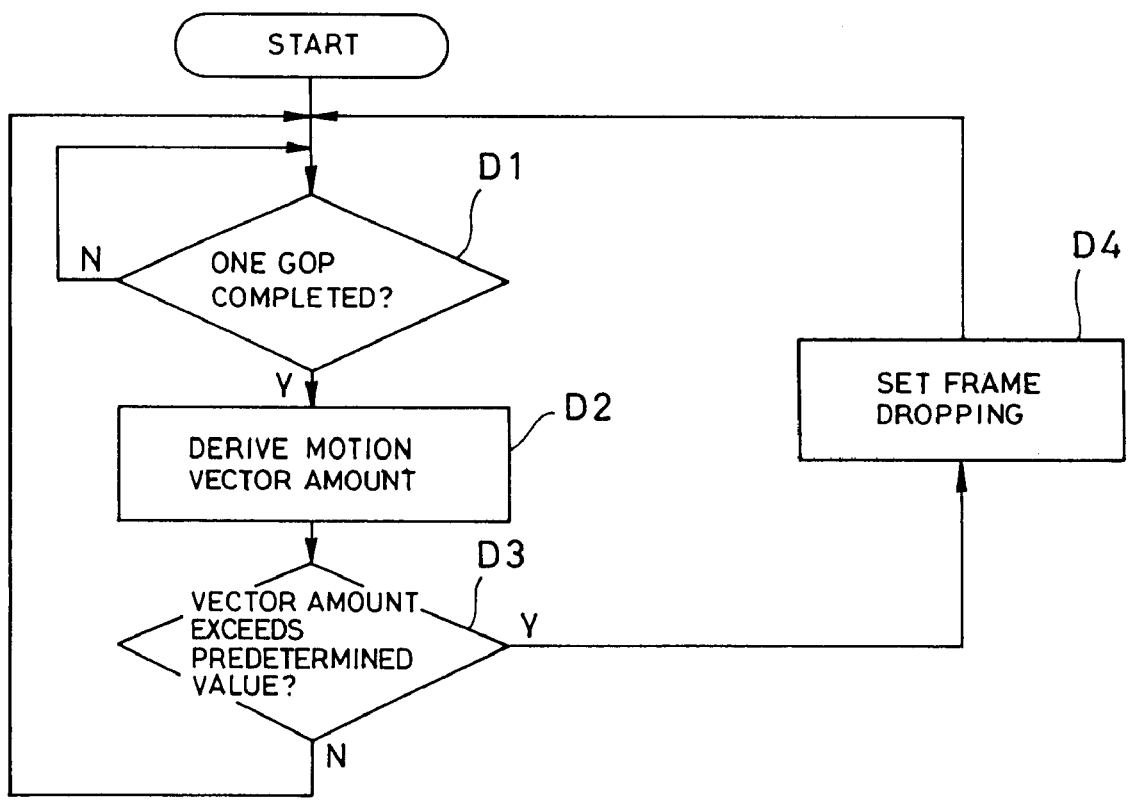
FIG. 9 is a flowchart showing operation of the fourth embodiment of a video recording method according to the present invention.

FIG. 9 is a flowchart showing the fourth embodiment of the video recording method according to the present invention.

Figure 10:
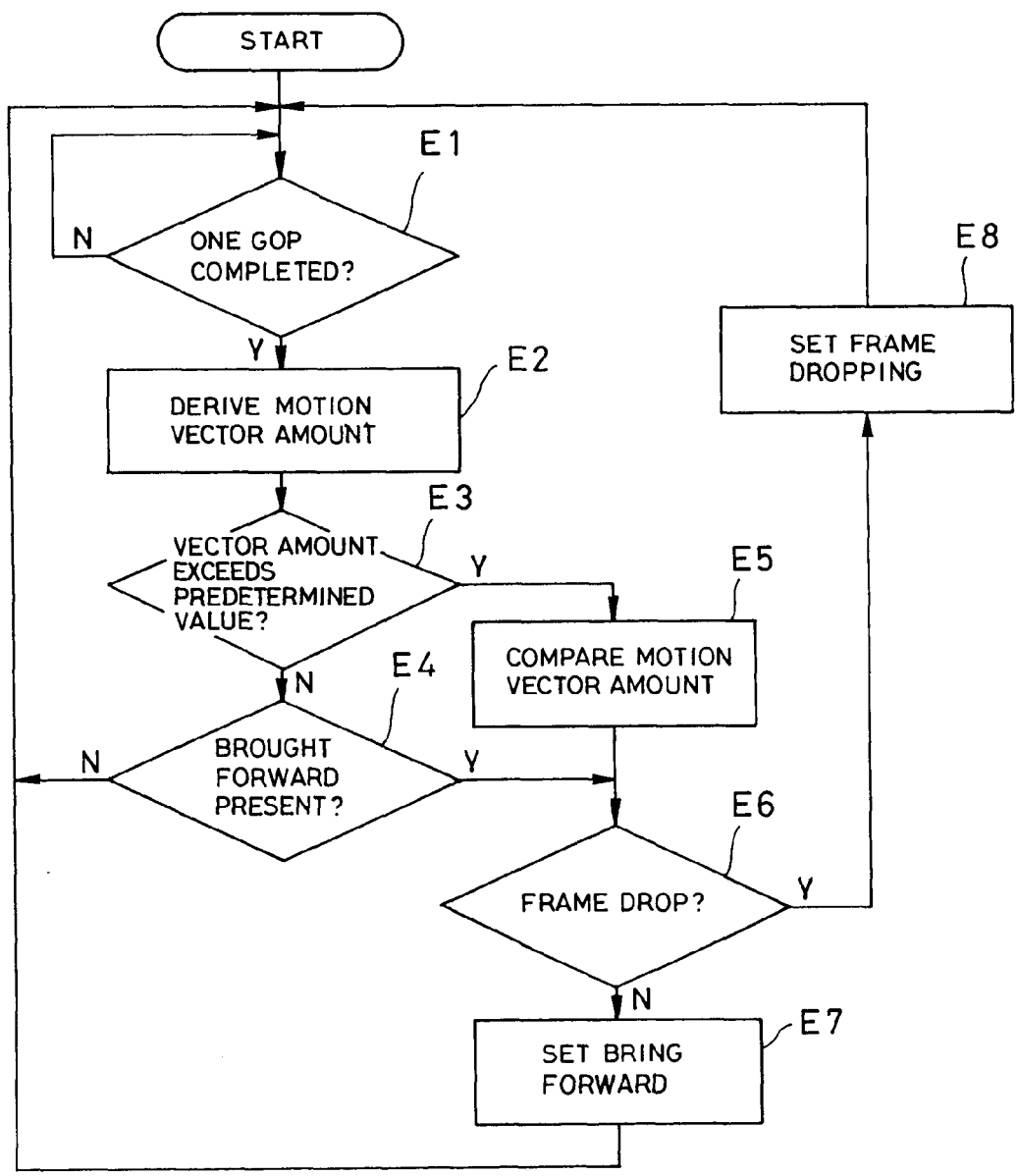
FIG. 10 is a flowchart showing operation of the fifth embodiment of a video recording method according to the present invention.

FIG. 10 is a flowchart showing the fifth embodiment of the video recording method according to the present invention.

Operation will be discussed in detail with reference to FIGS. 9 and 10.

The basic process flow is the same as those discussed with respect to the first and second embodiments. However, different from the case where the frame dropping process is performed with reference to the compression processing period per one GOP in the first and second embodiment, the fourth and fifth embodiments performs frame dropping based on the motion vector amount per one GOP.

FIG. 9 shows the case where the frame dropping process as discussed in the first embodiment is performed on the basis of the motion vector amount. When compression process of the video signal 21 captured by the video capturing portion 8 is initiated, the video compression is repeated until data for one GOP is compressed (step D1). When data f or one GOP is compressed, the motion vector amount for one GOP is derived (step D2). The motion vector amount information 25 is applied for the case where the horizontal axis of the graph shown in FIG. 3 is replaced with the motion vector amount (step D3).

Large vector amount information 25 may results in judgment of the picture of abrupt motion or large motion, in which motion retrieving process is frequently performed. In general, motion retrieving process is heavy in load and time consuming. Therefore, a period to be taken for compression process is predicted by making reference to the motion vector amount information. Therefore, it becomes possible to determine the criterion value a as reference for making judgment for the motion vector amount as if the time data. If judgment is made that the motion vector amount information 25 is smaller than the criterion value a, judgment is made that the compression process for one GOP is completed in real time to perform compression process for the next GOP. On the other hand, if judgment is made that the motion vector amount information 25 is in excess of the criterion amount a, judgment can be made that compression process for one GOP cannot be completed in real time. Then, setting for the frame dropping in the process for the next GOP is performed (step D4), the process transit to the process for the next GOP. Namely, the motion vector amount is measured per one GOP to perform frame dropping in the process of next GOP when judgment is made that the motion vector amount is in excess of the criterion value. Accordingly, the frame dropping process is not performed in the process of current GOP. Number of frames to be dropped in the process of the GOP is determined by applying the motion vector amount in the process of the current GOP in the case where the horizontal axis of FIG. 3 is replaced with the motion vector amount.

Next, FIG. 10 shows where the frame dropping process as discussed in the second embodiment is performed on the basis of the motion vector amount. When compression process is initiated, the video compression is repeated until data for one GOP is compressed (step El). When data for one GOP is compressed, the motion vector amount for one GOP is derived (step E2). The motion vector amount information 25 is applied for the case where the horizontal axis of the graph shown in FIG. 3 is replaced with the motion vector amount (step E3). If judgment is made that the motion vector amount information is smaller than the criterion value a, judgment is made that the compression process for one GOP is completed in real time to perform compression process for the next GOP.

On the other hand, if judgment is made that the motion vector amount is in excess of the criterion amount a, judgment can be made that compression process for one GOP cannot be completed in real time. Then, setting for the frame dropping in the process for the next GOP is performed, the process transit to the process for the next GOP. At first, the motion vector amount in the process of the preceding GOP and the motion vector amount in the process in the current GOP are compared to apply a difference value to the graph shown in FIG. 8. By taking the difference with the preceding GOP. the status of the current picture can be detected. When the process period for one GOP is large, for example, the difference is quite large, it can be judged that quite large motion is abruptly caused (awkward motion). Conversely, when the difference is quite small, judgment can be made that large motion is continued (smooth motion). Here, judgment of frame drop in the next GOP is made. If dropping of frame is performed while judgment is made that smooth motion is performed, frame drop can be easily perceived as reproduced. In such case, frame drop is not performed and repeat setting for effecting frame drop in the two next GOP. Thereafter, the process for the next GOP is performed (steps E5, E6 and E7 ). On the other hand, if judgment is made that the motion of the picture is not particularly smooth, frame dropping is determined for effecting frame dropping in the process of the next GOP. Then process transit to the process for the next GOP (steps E5, E6 and E8).

It should be noted that even when the process period during the process of the next GOP does not exceed the predetermined period a, if the repeat setting is made, the frame drop process is performed in the process of the next GOP unconditionally (step E4).

It should be noted that in some condition, there is a case where the frame drop process cannot be performed in the two next GOP process. In such case, the process of frame drop is brought forward to the further next GOP. In addition, it is considered that the number of the frame to be dropped is increased. In such case, the process for dropping of frame is brought forward to the further next GOP in the condition where the number of frames to be dropped is increased. However, when the quite large number of frames are dropped in the process of one GOP, if reproduction process of the compressed data is performed, motion of the reproduced picture becomes awkward except for the case where the picture is completely still condition to provide quite non-smooth feeling to the user. Therefore, it becomes necessary to preliminarily determine the maximum number of frames to be dropped in the compression process of the next GOP when a period greater than or equal to a given period is taken for the compression process.

As set forth above, even when the object for making judgment of frame dropping is changed from the process period to the motion vector amount, the same effect as the first and second embodiments can be achieved.

As set forth above, the video recording apparatus and recording method therefor monitors the condition of compression process per the video information block (GOP) by the process period and the motion vector to perform frame dropping depending upon the monitored condition of the next video information block. Therefore, even upon occurrence of the case where compression process in real time cannot be realized due to difference of performance of the computer, for example, low operation speed of CPU or due to picture pattern or motion to be performed, the video data can be recorded as data compressed in real time.

On the other hand, in the compression process, moving picture pattern of the next (future) video information block is predicted from the process condition in the preceding (past) vide information block and the current information block to vary the condition for frame dropping depending upon the condition. Therefore, even when frame drop is caused in the compression process for recording in real time, when the recorded data is reproduced, the user viewing the picture hardly perceive the drop out of the frame.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A video recording method comprising:
   first step of measuring a compression process period per one group of frame data of a video signal taken by video capturing; and
   second step of performing frame dropping process in next one group of frame data when said compression process period exceeds a predetermined value.

2. A video recording method as set forth in claim 1, wherein said second step includes determining of dropping of frame by deriving a difference between the compression processing period of said one group of the frame data and the compression processing period of the next group of the frame data and comparing the difference with the predetermined value when said compression process period exceeds said predetermined period.

3. A video recording method as set forth in claim 1, wherein said second step includes determining of dropping of frame by deriving a difference between the compression processing period of said one group of the frame data and the compression processing period of the next group of the frame data and, if the next group of the frame data does not permit dropping of the frame, dropping of the frame is brought forward to the two next group of the frame data instead of performing dropping of frame in the next group of the frame data.

4. A video recording method as set forth in claim 1, wherein said second step includes determining of dropping of frame by deriving a difference between the compression processing period of said one group of the frame data and the compression processing period of the next group of the frame data and, if the next group of the frame data does not permit dropping of the frame, dropping of the frame is brought forward to the further next group of the frame data in the condition where the number of frames to be dropped is increased.

5. A video recording method comprising:
   first step of measuring a motion vector amount per one group of frame data of a video signal taken by video capturing; and
   second step of performing frame dropping process in next one group of frame data when said motion vector amount exceeds a predetermined value.

6. A video recording method as set forth in claim 5, wherein said second step includes determining of dropping of frame by deriving a difference between the motion vector amount of said one group of the frame data and the motion vector amount of the next group of the frame data and comparing the difference with the predetermined value when said compression process period exceeds said predetermined period.

7. A video recording method as set forth in claim 5, wherein said second step includes determining of dropping of frame by deriving a difference between the motion vector amount of said one group of the frame data and the motion vector amount of the next group of the frame data and comparing the difference with the predetermined value when said motion vector amount exceeds said predetermined period.

8. A video recording method comprising:
   first step of measuring a compression process period and a motion vector amount per one group of frame data of a video signal taken by video capturing; and
   second step of performing frame dropping process in next one group of frame data when at least one of said compression process period and said motion vector amount exceeds a predetermined value.

9. A video recording apparatus comprising:
   a video capturing portion taking a video data and outputting a first video signal;
   a compression control portion receiving said first video signal, compressing said first video signal for outputting a compressed video signal;
   a file output portion for writing and recording said compressed video signal;
   said compression control portion including
      a timer measuring a compression process period and outputting a time information;
      a motion detecting portion detecting a motion vector amount of said first video signal and outputting detected information;
      a motion vector deriving portion deriving a motion vector amount per a group of frame data from said detected information and outputting a motion vector amount information;
      a video compressing portion performing compression process for a second video signal output from said motion detecting portion and outputting said compressed video signal; and
      a frame drop control portion making judgment whether dropping of frame is to be performed or not for a next one group of frame data from said time information and said motion vector amount information, and outputting a frame drop execution information to said motion detecting portion and said video compressing portion when judgment is made to perform dropping of frame.

10. A video recording apparatus as set forth in claim 9, wherein said video capturing portion comprises:
    a capture control portion capturing control of said picture for outputting as video data; and
    a capture data memory temporarily storing said video data and outputting said first video signal.

11. A video recording apparatus as set forth in claim 9, wherein said file output portion comprises:
    a compression data memory storing said compressed video signal and outputting a compressed video data;

a file output control portion file controlling said compressed video data; and a hard disk controlled by said file output control portion for storing said compressed video data.

12. A video recording apparatus as set forth in claim 9, wherein if said time information does not exceed a predetermined period, judgment is made that compression process for one group of frame data us completed, and said time information exceeds said predetermined period, frame drop process for next one group of frame data is set.

13. A video recording apparatus as set forth in claim 9, wherein a difference between a compression process period of said one group of frame data and a compression process period of the next one group of frame data, is calculated and dropping of frame is determined by comparing the difference with a preset value.

14. A video recording apparatus as set forth in claim 9, wherein if said motion vector amount information does not exceed a preset value, judgment is made that compression process for said one group of frame data is completed, and when said motion vector amount information exceeds the preset value, dropping of frame for the next group of frame data is set.

15. A video recording apparatus as set forth in claim 9, wherein a difference between a motion vector amount information of said one group of frame data and a motion vector amount information of the next one group of frame data, is derived, and the difference is compared with a preset value for determining dropping of frame.

16. A video recording apparatus as set forth in claim 9, wherein a difference between a compression process period of said one group of frame data and a compression process period of the next one group of frame data, is calculated and the difference is compared with a preset valued, when frame cannot be dropped in the next group of video data, dropping of the frame is not performed in the next group of video data for repeat setting for frame dropping in two next group of frame data, and thereafter a post process is performed.

17. A video recording apparatus as set forth in claim 9, wherein a difference between a compression process period of said one group of frame data and a compression process period of the next one group of frame data, is calculated and the difference is compared with a preset valued, when frame cannot be dropped in the next group of the frame data, dropping of the frames is brought forward to further next group of the frame data in the condition where the number of frames to be dropped is increased.

\* \* \* \* \*